Patented Apr. 26, 1949

2,468,664

UNITED STATES PATENT OFFICE 2,468,664

TETRAFLUOROETHYLENE COPOLYMERS

William E. Hanford, Easton, Pa., and John R. Roland, Jr., Wilmington, Del., assignors to E. I. du Pont de Nemours & Company, Wilmington, Del., a corporation of Delaware No Drawing. Application August 28, 1945, Serial No. 613,212

12 Claims. (Cl. 260—86)

This invention relates to polymeric materials and more particularly to polymers obtained from tetrafluoroethylene.

This application is a continuation in part of our application Serial No. 463,410 filed October 26, 1942 now abandoned.

The polymerization of tetrafluoroethylene has been described previously. The polymerization of this compound has been effected, for example, by allowing tetrafluoroethylene to stand at room temperature or above at superatmospheric pressure in the presence of certain polymerization catalysts. The polymerized product heretofore obtained is a hard, tough, infusible solid which is insoluble in and unattacked by inorganic acids, alkalies, and organic solvents. While this combination of properties is very desirable for a great many applications, these very properties make the polymer unavailable for other uses.

This invention has as an object new and useful compositions of matter. A further object is valuable high molecular weight polymers comprising tetrafluoroethylene. A still further object resides in a process for obtaining these polymers in high yields. Other objects will appear hereinafter.

The above objects are accomplished by the process more particularly described below which comprises polymerizing in the presence of oxygen or a peroxy compound as a catalyst a mixture of tetrafluoroethylene and another polymerizable organic compound having at least one ethylenic double bond. We have discovered that valuable macromolecular copolymers can be thus obtained which, because of their different physical properties, are adapted to a number of uses to which the polymerized tetrafluoroethylene itself is unsuited.

The operating conditions described herein, e. g., pressure, employed for the preparation of a given copolymer, will, in general, depend on the physical properties of the comonomer being used. That is, to obtain polymers of suitable molecular weight for some purposes, it is necessary to maintain an appreciable concentration of the polymerizable monomers in the polymerization phase. Thus, in the case of normally liquid comonomers, such as vinyl carboxylates, e. g., vinyl acetate, and esters of alpha-beta-unsaturated monocarboxylic acids, e. g., methyl methacrylate, adequate monomer concentrations are achieved at relatively low tetrafluoroethylene pressures, hence the polymerization can be carried out satisfactorily under pressures ranging up from 3 to 1000 atmospheres or more. While the process of this invention is operable at pressures as low as 3 atmospheres, with normally gaseous comonomers, such as olefinic hydrocarbons, e. g., ethylene and isobutylene, and halogenated ethylenes, e. g., vinyl fluoride, vinyl chloride, chlorotrifluoroethylene etc., higher pressures, for example, at least 20 atmospheres are desirable to achieve such monomer concentrations as will lead to high molecular weight polymers.

Operable reaction temperatures range from as low as 10° C. in some instances to as high as 300° C. in other instances, but, as in the case of pressure, the particular temperature selected within this range will depend on the nature of the comonomer with which the tetrafluoroethylene is copolymerized. For the preparation of copolymers of tetrafluoroethylene with normally liquid unsaturated hydrocarbons, e. g., styrene and butadiene, the polymerization reaction is generally carried out at lower temperatures, e. g., 10°–80° C. and at pressures of at least 10 atmospheres.

The properties of the tetrafluoroethylene copolymers of this invention vary considerably with the comonomer employed, ranging from viscous gels to tough, high-softening thermoplastics. In general, they differ from the homopolymers of each comonomer in exhibiting abnormally high tensile strengths, and in the case of soluble polymers, abnormally high viscosity in solution. The polymers also possess excellent chemical and thermal stability, good electrical properties and low to negligible flammability.

Those copolymers containing from 5% to about 95% of tetrafluoroethylene, based on the combined weight of the tetrafluoroethylene and other ethylenically unsaturated compound or compounds previously mentioned, are the most valuable since in this range is obtained the maximum differentiation in properties from those of the unmodified homopolymers.

In the case of the copolymers of tetrafluoroethylene with ethylene particularly valuable copolymers are obtained by using the ethylene in the proportions mentioned below.

Tetrafluoroethylene/ethylene copolymers containing from 40% to 90% tetrafluoroethylene by weight soften in the range 200–300° C., depending on their composition. These copolymers exhibit good dimensional stability below their softening points and have tensile strengths ranging from 6000–10,000 lbs./sq. in. It is highly surprising and totally unexpected that such copolymers should have tensile strengths two to three times as high as the tensile strengths of polytetrafluoroethylene or of the ethylene homopolymer. Despite their relatively high tetrafluoroethylene content these polymers, in contrast to polytetrafluoroethylene which is believed insoluble in all liquids, can be dissolved in a variety of solvents at elevated temperatures. However, they are unaffected by organic solvents at ordinary temperatures. Tetrafluoroethylene/ethylene copolymers containing from 15% to 40% of tetrafluoroethylene by weight differ from the ethylene homopolymer in possessing higher softening points, decreased solubility, increased solution and melt viscosity, and in being more inert to chemical reagents. In addition, they appear to be remarkably strong compared with the ethylene homopolymer.

Tetrafluoroethylene / isobutylene copolymers containing from 55% to 80% tetrafluoroethylene by weight are stiff, tough, transparent to translucent, nonresilient but flexible thermoplastic resins, which have softening points ranging from 100°–200° C. and tensile strengths ranging from 3500–6000 lbs./sq. in., again remarkably higher than those of either parent homopolymer. In contrast to the ethylene interpolymers these copolymers exhibit considerable plastic flow at temperatures well below their true softening points. These copolymers can be dissolved in hot solvents above about 120° C. Copolymers of tetrafluoroethylene with isobutylene containing less than about 55% tetrafluoroethylene have lower softening points, and, in general range from transparent viscous gels to low melting (below 100° C.) thermoplastic resins.

Copolymers of tetrafluoroethylene with certain completely halogenated olefins, e. g., chlorotrifluoroethylene, resemble polytetrafluoroethylene in being inert to chemical reagents, but possess the remarkable advantage over polytetrafluoroethylene of being extrudable and generally more workable in the molten state. Thus, these copolymers represent a class of materials having the general properties of polytetrafluoroethylene, but applicable in certain uses to which polytetrafluoroethylene cannot be applied because of the difficulty of working it in the molten state.

Copolymers of tetrafluoroethylene with halohydroethylenes, e. g., vinyl fluoride, vinyl chloride, 1,1-difluoroethylene, etc., are in general soluble, high softening tough thermoplastics. While their softening temperatures and thermal stabilities are generally intermediate between those of polytetrafluoroethylene and of the homopolymer of the comonomer, they possess surprisingly high dielectric constants which, in combination with moderately good power factors, make them a unique class of materials for high temperature chemically resistant dielectric insulators.

The copolymers of tetrafluoroethylene with vinyl carboxylates, e. g., vinyl acetate, are stiff thermoplastic resins having softening points which are higher than those of the corresponding polyvinyl carboxylate. In general, the copolymers are transparent and have good tensile strengths.

In the best method of performing the invention the reaction is carried out under pressure substantially above atmospheric, usually within the range of 20–350 atmospheres, and at a temperature in the range of 35°–150° C. in the presence of water and the oxygen or peroxy catalyst.

It is to be observed that there is no upper pressure limit except that imposed by available apparatus, and that the upper pressure mentioned is determined by convenience or economy rather than by material differences in results as the pressure rises indefinitely beyond the minimum value required to yield the desired results. The presence of water leads to a smoother process and aids in controlling the reaction which otherwise may take place too violently. The reaction can be run in a closed system if desired, but it is advantageous to inject, either batchwise or continuously, a mixture of tetrafluoroethylene and the unsaturated compound in the desired proportions as the reaction progresses. Since tetrafluoroethylene is a gas, the course of the reaction may be followed by the drop in pressure in the reaction container, and cessation of reaction is indicated by cessation of the pressure drop. Depending on the polymerizing characteristics of the particular unsaturated compound which is polymerized with the tetrafluoroethylene the operable temperatures and pressures will vary somewhat widely as has been pointed out previously. The polymerizable compositions used in obtaining the present copolymers preferably consist wholly or in major amount of the mixture of tetrafluoroethylene and the other comonomers described above.

The invention is further illustrated by the following examples in which the parts are by weight unless otherwise indicated.

*Example I*

A stainless steel high pressure reactor having a capacity of about 400 parts by volume is flushed with oxygen-free nitrogen and charged with 25 parts of deoxygenated water, 175 parts of tertiary butyl alcohol, and 0.15 part of ammonium persulfate. The reactor is closed, evacuated, and then further charged with a mixture of tetrafluoroethylene and ethylene having a mole ratio of tetrafluoroethylene to ethylene of 1:0.79. The reactor is agitated and heated at 50° C. while maintaining an internal pressure within the range of 300–350 lbs./sq. in. by the periodic injection of the above indicated monomer mixture. After heating for 1.5 hours, the reactor is cooled, the pressure is released and the product is discharged. There is thus obtained a tetrafluoroethylene/ethylene copolymer in the form of a thick slurry which is coagulated by steam distillation. The copolymer, when washed and dried, amounts to 52 parts. The copolymer contains 61.9% fluorine which corresponds to a mole ratio of tetrafluoroethylene to ethylene of 1:0.815. A film of the copolymer softens at 285° C.; it has a tensile strength of 8000 lbs./sq. in. at 400% elongation, a power factor (1 kc.) of 0.1% and a dielectric constant (1 kc.) of 2.7. Solutions of this copolymer can be obtained by heating the polymer in dimethyl glutarate, dimethyl adipate, diethyl adipate, diisobutyl adipate, dimethyl azelate, dibutyl sebacate, dimethyl methadipate, dimethyl hexahydrophthalate, isophorone, benzophenone, or a mixture of unsaturated cyclic ketones boiling within the range of 250–325° C. and containing 12 to 18 carbon atoms. Dispersions can be prepared by cooling solutions of the polymer until gellation occurs and then vigorously stirring the gelled solution.

Porous articles can readily be prepared by dissolving the polymer in a solvent, such as camphor or a camphor-isofenchone mixture at elevated temperature, cooling the solution to solidify the mixture and finally removing by any convenient method, such as extraction or sublimation, the solidified material which functioned as the solvent at elevated temperature.

Polymers of lower molecular weight and lower melt viscosity can be obtained by replacing a portion of the tertiary butyl alcohol with acetone, methyl alcohol, ethyl alcohol or isopropyl alcohol. These polymers are soluble in nitrobenzene, acetophenone and chlorinated ethyl benzene.

Example II

A stainless steel-lined pressure reactor is charged with 100 parts of oxygen-free water and 0.1 part of benzoyl peroxide; the pH is adjusted to 3.4 by the addition of aqueous formic acid. The loading of the reactor is conducted under an atmosphere of oxygen-free nitrogen. The reactor is closed and charged with a mixture of tetrafluoroethylene and ethylene containing 10% of the former by weight. The reactor is agitated and heated to 75° C., and the pressure is maintained in the range 700–900 atmospheres by the injection of a liquid mixture of tetrafluoroethylene and ethylene containing 10% of the former by weight. When the pressure drop ceases, the tube is cooled and discharged. There is obtained 30 parts of a white polymer which contains 22.34% fluorine, or an average ratio of one $C_2F_4$ unit to 8.6 $C_2H_4$ units. This copolymer is completely soluble in such solvents as hot xylene and hot tetrachloroethylene, thus being distinguished from pure polytetrafluoroethylene, which is absolutely insoluble in such solvents. The polymer has an intrinsic viscosity (as defined in U. S. Patent 2,130,948) of 2.16 (0.125% solution in xylene at 85° C.). The polymer can be pressed to a tough, clear, pliable film at 150° C., and 400 lbs./sq. in. The film has a tensile strength, based on the original dimensions, of 2355 lbs./sq. in. and an elongation of 464%. Tough, transparent foils can be cast from a 10% solution of the polymer in hot xylene; these foils exhibit remarkable clarity and resistance to tear.

Example III

A silver-lined pressure reactor is charged with 100 parts of water, 30 parts of freshly distilled vinyl acetate, 2 parts of disodium phosphate dodecahydrate and 0.2 part lauroyl peroxide. The reactor is then closed and there is added 20 parts of gaseous tetrafluoroethylene and then sufficient ethylene to raise the gas pressure within the reactor to 600 atmospheres. The reactor is agitated and heated at 60° C. and the pressure is maintained in the range of 840–980 atmospheres by the injection of additional ethylene. After eight hours the reactor is cooled and discharged to yield 42 parts of white tough, rubbery polymer. The polymer contains 23.87% fluorine and 53.85% carbon corresponding to a molar ratio of vinyl acetate:tetrafluoroethylene:ethylene of 1:0.65:2. The polymer softens at 150°–180° C. and is soluble in hot xylene. The vinyl acetate/tetrafluoroethylene/ethylene copolymers can be hydrolyzed to obtain modified polyvinyl alcohols.

Example IV

A stainless steel high pressure reactor having a capacity of about 400 parts by volume is flushed with oxygen-free nitrogen and charged with 200 parts of deoxygenated water and 0.2 part of benzoyl peroxide. The reactor is closed and is further charged with 150 parts of a mixture of tetrafluoroethylene and isobutylene having a mole ratio of tetrafluoroethylene to isobutylene of 2:1. The reactor is agitated and heated at 80° C. while maintaining an internal pressure within the range of 2700–2900 lbs./sq. in. by the periodic injection of additional quantities of the tetrafluoroethylene-isobutylene mixture indicated above. After a re-reaction period of 15.5 hours the reactor is cooled, the pressure released and the product is discharged. The copolymer, when washed and dried, amounts to 130 parts and contains 51.6% fluorine which corresponds to a mole ratio of tetrafluoroethylene to isobutylene of 1.2:1. Films are prepared by hot pressing the copolymer at 220° C.

Example V

A stainless steel-lined pressure reaction vessel is charged with an aqueous emulsion consisting of 58 parts of copper-free distilled water, 0.53 part of sodium hydroxide, 2 parts of oleic acid, 0.5 part of a sodium salt of a sulfonated naphthalene-formaldehyde condensation product, 0.3 part of octyl mercaptan, and 0.5 part of ammonium persulfate. The reaction vessel is closed and 15 parts of tetrafluoroethylene and 35 parts of 1,3-butadiene are added. The valve on the pressure reaction vessel is closed and the reaction mixture is heated for 20 hours at 50° C. while rotating the reaction vessel end over end. The white latex-like emulsion is stabilized by the addition of 2 parts of a 50% dispersion of a 55:45 eutectic mixture of phenyl-alpha-naphthyl amine and diphenyl amine. The aqueous emulsion is coagulated by the addition of dilute acetic acid and brine. The resulting rubbery copolymer is washed with water on a corrugated rubber mill and finally dried on a heated smooth rubber mill. There is obtained twenty-nine parts of a rubber-like copolymer containing 17.5% fluorine by analysis, which corresponds to an average ratio of one $C_2F_4$ unit to 6.2 $C_4H_6$ units.

The copolymer is compounded according to the following formula and cured for thirty minutes at 145° C.

|  | Parts |
|---|---|
| Copolymer | 10.0 |
| Phenyl-alpha-naphthylamine | 0.2 |
| Carbon black | 5.0 |
| Stearic acid | 0.2 |
| Sulfur | 0.2 |
| Mercaptobenzothiazole | 0.1 |
| Zinc oxide | 0.5 |

A snappy, resilient, rubber-like vulcanizate is obtained.

Example VI

A stainless steel-lined pressure reactor is charged with 100 parts of water, 40 parts of freshly steam distilled styrene, and 0.4 part of benzoyl peroxide. After closing the reactor, there is added 35 parts of gaseous tetrafluoroethylene. The reactor is agitated and heated at 90° C. for five hours. The copolymer obtained after steam distillation and subsequent drying on a hot rubber mill is a brittle solid containing 5.82% fluorine, or an average ratio of one $C_2F_4$ unit to 11.6 $C_8H_8$ units.

Example VII

A silver-lined high pressure reactor is swept with nitrogen and charged with 200 parts of deoxygenated water and 0.3 part of ammonium persulfate. It is then closed, evacuated, and further charged with 15 parts of vinyl chloride and 85 parts of tetrafluoroethylene. The reactor is agitated and heated at 70° C., maintaining an internal pressure within the range of 2200–2500 lbs./sq. in. by the periodic injection of deoxygenated water. The total pressure drop during four hours heating is 1000 lbs./sq. in. The reactor is then cooled, the pressure released and the product is discharged. The copolymer, when washed and dried, amounts to 57 parts and is found to contain 60.6% fluorine which corresponds to a tetrafluoroethylene/vinyl chloride copolymer having a mole ratio of tetrafluoroethylene to vinyl chloride of 2.44:1.

*Example VIII*

A stainless steel high pressure reactor having a capacity equivalent to about 400 parts of water is swept with nitrogen and charged with 100 parts of deoxygenated water and 0.2 part of benzoyl peroxide. It is then closed, evacuated, and further charged with 52 parts of tetrafluoroethylene and 102 parts of vinyl fluoride. The reactor is agitated and heated at 80° C. while maintaining an internal pressure within the range of 200–310 atms. by the periodic injection of deoxygenated water. The sum of the pressure drops during nine hours is 450 atms. The reactor is then cooled, the pressure released, and the product is discharged. The copolymer, when washed and dried, amounts to 83 parts and is found to contain by analysis 45.2% of tetrafluoroethylene which corresponds to a tetrafluoroethylene:vinyl fluoride mole ratio of 1:2.63. Tough films which are capable of being cold drawn are obtained by pressing the copolymer at 200° C. The copolymer is more stable to heat than polyvinyl fluoride and can be molded at 200° C. to give a bar having a Charpy impact strength greater than 8 ft. lbs./in. notch. It is soluble in dimethylformamide and excellent films can be cast from these solutions.

*Example IX*

A stainless steel-lined pressure reactor is charged with 100 parts of water, 0.2 part of ammonium persulfate, 4 parts of borax, 30 parts of 1,1-dichloroethylene, and 100 parts of tetrafluoroethylene. The reactor is agitated and heated at 75° C. for six hours. The resulting product is a hard resin containing 2.18% fluorine, or 2.9% tetrafluoroethylene by weight.

*Example X*

A silver-lined high pressure reactor is swept with oxygen-free nitrogen and then charged with 0.4 part of benzoyl peroxide and 200 parts of deoxygenated water. The reactor is then closed, evacuated and then further charged with 60 parts of tetrafluoroethylene and 15 parts of 1,1-difluoroethylene through a valve. The reactor is agitated and heated to 80° C. The pressure within the reactor is then raised to 3200 lbs./sq. in. by the injection of additional deoxygenated water. The temperature is maintained at 80° C. and additional deoxygenated water is periodically injected to maintain the pressure within the range of 3000–3200 lbs./sq. in. The sum of the individual pressure drops during 9 hours reaction time is 1600 lbs./sq. in. The reaction vessel is cooled to room temperature, the unreacted portion of the gaseous monomers is bled off, and the contents of the tube are discharged. There is obtained 24 parts of a copolymer which contains 69.3% fluorine which corresponds to a mole ratio of tetrafluoroethylene: 1,1-difluoroethylene of 1:1. A film obtained by hot pressing the copolymer has a tensile strength of 3900 lbs./sq. in. at 548% elongation, a temperature of zero tenacity of 231° C., a dielectric constant (1 kc.) of 8.59 and a power factor (1 kc.) of 0.0171. The copolymer is insoluble in hot nitrobenzene and in hot isophorone but can be extruded into filaments when heated at 291° C. under pressure.

*Example XI*

A stainless steel high pressure reactor is flushed with oxygen-free nitrogen and charged with 200 parts of deoxygenated water, 0.3 part of ammonium persulfate, 0.075 part of sodium bisulfite and 1.2 parts of borax. The reactor is closed and is further charged with 55 parts of chlorotrifluoroethylene and 45 parts of tetrafluoroethylene. The reactor is agitated and heated at 60° C., within the range of 350–400 lbs./sq. in. After a reaction period of 17.3 hours, the reactor is cooled, the pressure is released and the product is discharged. The copolymer, when washed and dried amounts to 35 parts. The copolymer contains 17.07% chlorine which corresponds to a chlorotrifluoroethylene content of 56% or a mole ratio of tetrafluoroethylene to chlorotrifluoroethylene of 1:1. A colorless transparent film, obtained by pressing the copolymer at 240° C. under a pressure of 10,000 lbs., has a tensile strength of 3870 lbs./sq. in., can be elongated 380% and has a modulus of elasticity of $0.0675 \times 10^6$ lbs./sq. in. The films are nonflammable and, when heated under a tension of 20 lbs./sq. in., pull apart at a temperature of 217° C. The polymer is insoluble in all organic solvents; it is much more workable than polytetrafluoroethylene.

*Example XII*

A stainless steel lined high pressure reactor is charged with 100 parts of water, 2 parts of disodium phosphate and 50 parts of vinyl acetate. The air in the free space of the vessel corresponds to 0.075 part of oxygen. The reaction vessel is closed and is further charged through a valve with 25 parts of tetrafluoroethylene. The reactor is agitated and heated at 150° C. for five hours. It is then cooled, opened and the contents removed. The unpolymerized vinyl acetate is removed by steam distillation and the copolymer is obtained as a light yellow solid containing 16.25% fluorine which corresponds to a ratio of tetrafluoroethylene to vinyl acetate of 1:4.27. The copolymer melts at 180° C. and is soluble in hot dioxane, xylene, benzene, pyridine, and chloroform and can be hydrolyzed to a modified polyvinyl alcohol.

*Example XIII*

A stainless steel-lined pressure reactor is charged with 100 parts of water, 50 parts of freshly distilled vinyl propionate, and 0.4 part of benzoyl peroxide. The pH is adjusted to 3.5 by the addition of aqueous formic acid. The reactor is then closed and there is added 37 parts of gaseous tetrafluoroethylene. The reactor is agitated and heated at 80° C. for five hours. The product obtained upon cooling and opening the reactor is subjected to steam distillation and is then dried on a small heated rubber mill. There is obtained a tough rubber-like sheet which contains 19.65% fluorine, corresponding to an average ratio of one $C_2F_4$ unit to 2.87 $C_5H_8O_2$ units. The tetrafluoroethylene/vinyl propionate copolymer can be hydrolyzed to a fluorine-containing modified polyvinyl alcohol.

*Example XIV*

A stainless steel-lined pressure reactor is charge with 100 parts of water, 0.2 part of ammonium persulfate, 2 parts of borax, and 30 parts of freshly distilled methyl methacrylate. The reactor is then closed and there is then added 100 parts of tetrafluoroethylene. The reactor is agitated vigorously and heated at 80° C. for six hours. On cooling and opening the tube there is obtained 22 parts of white granular polymer containing 4.61% fluorine.

*Example XV*

A silver-lined pressure reactor is charged with 100 parts of water, 34 parts of dimethyl-(vinylethynyl)-carbinol, and 0.2 part of benzoyl peroxide. The pH of the reaction mixture is adjusted to 3.4 by the addition of aqueous formic acid. The reactor is then closed and there is added 30 parts of tetrafluoroethylene. The reactor is then heated to 80° C. and agitated for six hours. The product is washed by steam distillation and is then completely dissolved in hot acetone, thus indicating that it contains no polytetrafluoroethylene, which is insoluble in acetone. Evaporation of the acetone under diminished pressure leaves a hard yellow resin which contains 3.36% fluorine.

The polymerizable unsaturated organic compounds useful in forming the present copolymers with tetrafluoroethylene are characterized by their ability to undergo polymerization with tetrafluoroethylene to form macromolecular polymers. Examples of such compounds are the monoethylenic hydrocarbons, such as ethylene, propylene, isobutylene, and styrene; halogenated compounds such as 1, 1-difluoro-2-chloroethylene, trifluoroethylene, chlorotrifluoroethylene, hexafluoropropene, and particularly the vinyl halides such as vinyl fluoride, vinyl chloride, and vinyl bromide; vinyl carboxylates, such as vinyl formate, acetate, vinyl benzoate, and vinyl esters of higher aliphatic carboxylic acids; esters, nitriles, amides, anhydrides, and acid halides of alpha-methylene monocarboxylic acids such as methyl methacrylate, methyl acrylate, methylalpha-chloroacrylate, acrylonitrile, methacrylic amides, methacrylic acid anhydride, and methacrylic acid fluoride; vinyl ethers such as vinyl ethyl ether and vinyl butyl ether; vinyl ketones, such as vinyl methyl ketone and vinyl phenyl ketone; N-vinyl compounds, such as N-vinyl succinimide, N-vinylphthalimide and N-vinyl carbazole; the esters of vinylene dicarboxylic acids, such as dimethyl fumarate and diethyl fumarate; compounds having more than 1 ethylenic double bond, such as butadiene, isoprene, 2-fluoro-1,3-butadiene, 2-chloro-1,3-butadiene, 2-cyano-1,3-butadiene, and cyclopentadiene; and compounds containing acetylenic unsaturation in addition to the ethylenic double bond, for example, monovinylacetylene, divinylacetylene, and vinyl (ethinyl)-carbinols. Of the classes of polymerizable unsaturated compounds disclosed above, those which contain a terminal ethylenic double bond, i. e., having

group wherein $x$ and $y$ are hydrogen or fluorine, are preferred because they copolymerize most readily with tetrafluoroethylene. Tetrafluoroethylene can be effectively copolymerized with one or more of the above polymerizable compounds to obtain 2-,3-, or multicomponent copolymers. Of the 3- component copolymers, the tetrafluoroethylene / chlorotrifluorethylene / vinyl fluoride and tetrafluoroethylene / vinyl fluoride / vinyl chloride copolymers are particularly valuable because they are soluble in solvents such as acetone and clear films can be obtained from their solutions. These clear films are suitable for use as photographic film bases.

It is possible to carry out the reaction in the presence of organic solvents instead of or in addition to water. Examples of solvents of this kind are hexane, octane, isooctane, cyclohexane, methyl cyclohexanes, methyl cyclopentanes, benzene, toluene, xylenes, acetone, methanol, ethanol, isopropanol, tertiary butanol, dioxane, and tertiary amyl alcohol.

Finely divided solids which serve as fillers can be included in the polymerization mixture, and the polymerization can be carried out in their presence. Examples of such fillers include pigments, such as titanium oxide and carbon black, metals, such as copper, aluminum and iron powder, and other finely divided materials such as mica, glass and asbestos. These and similar materials can also be added to the preformed polymers.

The peroxy compounds used in the practice of this invention are compounds containing the peroxy linkage —O—O—. Examples of these compounds are acyl peroxides, such as dibenzoyl peroxide, benzoyl acetyl peroxide, dilauroyl peroxide, diacetyl peroxide, and dipropionyl peroxide; dialkyl peroxides, such as diethyl peroxide, di-(tertiary butyl) peroxide and dipropyl peroxide; hydrogen peroxide; inorganic peroxides in combination with an anhydride of an organic acid such as barium peroxide with propionic anhydride, zinc peroxide, with butyric anhydride, and magnesium peroxide with acetic anhydride; and salts of non-metallic inorganic per-acids, such as ammonium persulfate, potassium persulfate and sodium persulfate. The catalyst should be used in an amount in excess of 0.001% based on the total weight of monomers and preferably there is employed between 0.01% and 1% and not more than about 5% of the catalyst.

The tetrafluoroethylene employed in the practice of this invention should be reasonably pure and should be substantially free of acidic substances such as HCl and HF, and should be reasonably free of oxygen. Although oxygen is a catalyst in the small amounts indicated in the preceding paragraph, larger proportions of oxygen have an adverse effect upon the reaction.

This polymerization reaction can be carried out in continuous fashion if desired. For example, a mixture of reactants can be passed continuously through a zone which is maintained at reaction conditions, and which can be provided with baffles, stirrers, or other means of agitation. Alternatively, the catalyst can be injected into the system which is passing through the reaction zone. In some cases, advantage may be derived by adding one or more of the polymerizing reactants to the mixture in the reaction zone. Particularly valuable polymers are obtained if a mixture of monomers having a composition corresponding to that of the copolymer is added at approximately the same rate as the copolymer is being formed. By such an expedient the concentration of the comonomer remains relatively constant during the polymerization. Continuous operation possesses many technical advantages, such as speed and economy of operation, accurate control of the reaction and of the proportions of reactants, and flexibility of operation.

The equipment employed in carrying out this invention must be of sufficient strength to withstand the pressures and temperatures employed. That portion of the equipment which comes in actual contact with the polymerizing system must be fabricated of or lined with a material which will not rapidly catalyze the decomposition of the peroxy compound, or which will not be rapidly corroded or otherwise affected by any of the components in the polymerizing system. Suitable materials include silver, aluminum, tin, enamel, glass, stainless steel, monel metal, and nickel. Just as in the case of the polymerization of tetrafluoroethylene alone using organic or inorganic peroxygen compounds as catalysts, reaction vessels constructed of mild steel can also be used for the copolymerization of tetrafluoroethylene. It is preferable that the reacting system be equipped with some means of providing agitation.

The polymerized products of this invention are adapted to a wide variety of uses. For example, they can be molded under elevated temperature and pressure into films, foils, tapes, and massive articles. Many of the latter are exceptionally hard and tough, and can be employed as bearings, gears, bushings, pump pistons and in general for those applications where hard high softening materials are desirable. They can be fabricated into cellular or expanded forms which are particularly useful in applications where spongy, resilient articles having communicating pores are desired. They are useful as adhesives, e. g., as a binder for particles of carborundum or other abrasive materials in abrasive compositions, for glass and silica in insulating forms and for iron or other magnetic materials in coil cores. These polymers can also be fabricated into gaskets and container closures. They can be employed as electrical insulators, such as spacer material for cable construction, as stopoff and mask materials combining insulating and corrosion resisting properties for use in plating baths, for wire coating by wrapping on the wire as a tape or yarn, or by coating the wire by melt extrusion or solution coating. Films of the polymers can be employed as dielectrics for condenser construction, spacers for storage batteries, etc. Containers and metallic objects in general can be lined or coated with films of the polymers, either by solution coating or by pressing and baking a film on the object, to furnish moisture resistant, impervious, corrosion resistant coatings. Flexible tubing can be fabricated by melt or solution extrusion or by melt-sealing a tape into a cylindrical form. The polymers can be spun into useful fibers by melt or solution extrusion techniques, and these can be oriented by drawing, and can be knitted or woven into a variety of fabrics. Large monofils can be prepared, for example, by melt extrusion, and are useful as brush bristles. By solvent casting techniques, films valuable as wrapping foils, etc. can be prepared. These polymers can also be used for coating electrical resistance wires.

As many apparently widely different embodiments of this invention may be made without departing from the spirit and scope thereof, it is to be understood that we do not limit ourselves to the specific embodiments thereof except as defined in the appended claims.

We claim:

1. A composition of matter comprising the polymerization product of a mixture of tetrafluoroethylene and another polymerizable unsaturated organic compound containing a terminal ethylenic double bond, said mixture containing the tetrafluoroethylene in an amount of from 5% to 95% of the combined weight of the tetrafluoroethylene and said compound containing a terminal ethylenic double bond.

2. The composition set forth in claim 1 in which said terminal ethylenic double bond is the sole ethylenic double bond contained in the organic compound.

3. The composition set forth in claim 1 in which said organic compound is aliphatic and in which said terminal ethylenic double bond is the sole ethylenic double bond.

4. The copolymer set forth in claim 1 in which said polymerizable organic compound is an unsaturated hydrocarbon containing a $CH_2=C$ group.

5. The copolymer set forth in claim 1 in which said polymerizable organic compound is a halogenated ethylene.

6. The copolymer set forth in claim 1 in which said polymerizable organic compound is ethylene.

7. The copolymer comprising the polymerization product of a mixture of tetrafluoroethylene and ethylene which contains the tetrafluoroethylene in an amount of from 15% to 90% of the combined weight of the tetrafluoroethylene and ethylene.

8. A process for obtaining copolymers which comprises heating in the presence of a catalyst to polymerizing temperature under a pressure of at least 3 atmospheres a mixture of tetrafluoroethylene and another polymerizable unsaturated organic compound containing a terminal ethylenic double bond, said mixture containing the tetrafluoroethylene in an amount of from 5% to 95% of the combined weight of the tetrafluoroethylene and said compound containing a terminal ethylenic double bond, said catalyst being selected from the group consisting of peroxy compounds and oxygen and being present in said mixture in an amount of from 0.001% to 5% of the combined weight of the tetrafluoroethylene and said compound.

9. The process set forth in claim 8 in which said polymerizable organic compound is an unsaturated hydrocarbon containing a $CH_2=C$ group.

10. The process set forth in claim 8 in which said polymerizable organic compound is a halogenated ethylene.

11. The process set forth in claim 8 in which said polymerizable organic compound is ethylene.

12. A process for obtaining a copolymer which comprises heating from 35° C. to 150° C. in the presence of a catalyst and under a pressure of at least 20 atmospheres a mixture of tetrafluoroethylene and ethylene which contains the tetrafluoroethylene in an amount of from 15% to 90% of the combined weight of the tetrafluoroethylene and ethylene, said catalyst being selected from the group consisting of peroxy compounds and oxygen and being present in said mixture in an amount of from 0.001% to 5% of the combined weight of the tetrafluoroethylene and ethylene.

WILLIAM E. HANFORD.
JOHN R. ROLAND, Jr.

REFERENCES CITED

The following references are of record in the file of this patent:

UNITED STATES PATENTS

| Number | Name | Date |
|---|---|---|
| 2,230,654 | Plunkett | Feb. 4, 1941 |

FOREIGN PATENTS

| Number | Country | Date |
|---|---|---|
| 110,457 | Australia | May 9, 1940 |
| 796,026 | France | Mar. 27, 1936 |